Patented Jan. 14, 1947

2,414,403

UNITED STATES PATENT OFFICE 2,414,403

METHOD OF PREPARING SULFONAMIDES

Robert Winterbottom, Stamford, Conn., assignor to American Cyanamid Company, New York, N. Y., a corporation of Maine No Drawing. Application February 17, 1945, Serial No. 578,560

6 Claims. (Cl. 260—239.6)

This invention relates to a new method of preparing amino-substituted-benzenesulfonamides, particularly those of the type which have been found to be therapeutically active.

During the past few years many therapeutically active sulfonamides have been prepared and described. Practically all of the useful compounds of this type are characterized by being aminobenzenesulfonamides with the amino group meta- or para-, most usually para-, to the sulfonamide group.

One of the most economical and practical methods of preparing these compounds involves reacting a benzenesulfonyl halide with a primary amine. As an aminobenzenesulfonyl halide would tend to react with itself, it has been considered necessary to use as the sulfonyl halide intermediate a benzenesulfonyl halide having a substituent on the benzene ring which could be converted to an amino radical after formation of the sulfonamide linkage. The same reasons have governed the selection of substituted-benzenesulfenyl halides in an analogous process. Accordingly, the prior art has used as intermediates nitro-benzenesulfonyl (or sulfenyl) halides or para-acylaminobenzenesulfonyl (or sulfenyl) halides. When using those intermediates having a nitro group, it is necessary, as a subsequent step, to reduce the nitro group to an amino radical. When the substituent on the benzene ring was a para-acylamino radical, it was necessary to hydrolyze the acylamino radical to an amino radical.

Unfortunately, the step of reducing the nitro group, or hydrolyzing the para-acylamino group, as the case may be, is not free from difficulty. For example, removal of the acetyl group by hydrolysis usually results in some hydrolysis of the sulfonamide with resulting decreased yield and increased cost of the product and, in some cases, results in complete hydrolysis of the sulfonamide, making it impossible to prepare certain sulfonamides, for example the tetrazole, in this way. Reduction of the nitro-group also gives rise to trouble in some cases in that undesirable side reactions frequently occur and the reducing action prevents preparation of pure compounds having certain substituents.

The present invention is based upon my discovery of a new process of synthesizing sulfonamides which avoids the difficulties mentioned above with respect to the hydrolysis or reduction steps of prior known processes. The invention involves as the first step the reaction of a primary aliphatic or aromatic amine with a benzenesulfonyl halide in which the benzene ring has attached at the desired position an imide group. After formation of the sulfonamide by reaction of the amine and benzenesulfonyl halide the product is then treated with hydrazine hydrate, whereby the imide group is cleaved, leaving an amino group attached to the benzene ring. These reactions may be illustrated by means of the following equations:

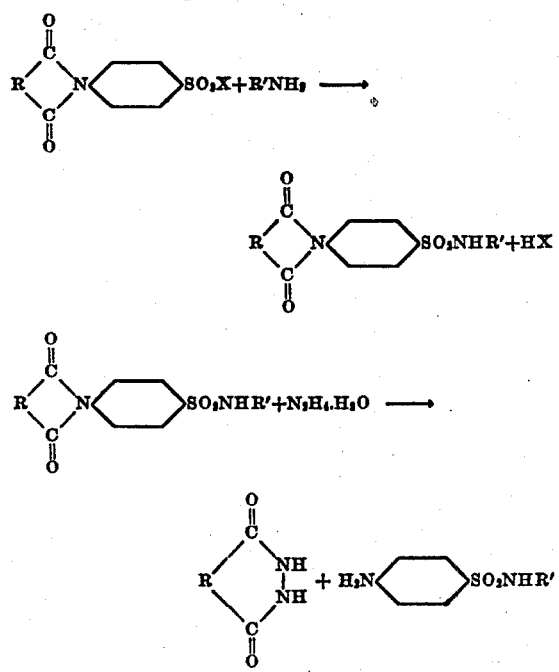

In these equations, X is a halogen, preferably chlorine, but also including bromine and fluorine; R is an alkylene, cycloalkylene or arylene radical and R' is an aliphatic or aromatic radical such as that obtained by removing a hydrogen from guanidine, pyridine, pyrimidine, pyridazine, pyrazine, tetrazole, thiazole, thiadiazole, or the like. These radicals may be substituted, of course, with appropriate substituents such as are known to those in the art.

Although the equations given above indicate that the imide group is attached at the para position, it will be understood, of course, that the same reactions will take place with this radical at the ortho- or meta-position of the benzene ring.

It is preferred that R in the equation above be an arylene radical such as phenylene, but this preference is based on the low cost and ready availability of phthalic acid from which the preferred imide is prepared. Obviously, imides derived from hexahydrophthalic acid, succinic acid, glutaric acid, naphthalene-1,2-dicarboxylic acid, pyridine-2,3-dicarboxylic acid, and other polycarboxylic acids may be used if desired.

Although any primary amine may be used in the reaction above, it is preferred that the amine be one which will result in the formation of a therapeutically active compound. Suitable amines include 2-aminopyrimidine, 2-amino-5-chloropyrimidine, 2-amino-4-methylpyrimidine, 2-amino-4,6-dimethylpyrimidine, 2-amino-4-ethoxypyrimidine, 2,4-diaminopyrimidine, 2-amino-4-brompyrimidine, 2-amino-4-phenylpyrimidine, 2-amino-5-carbethoxypyrimidine, 5-aminopyrimidine, 3-aminopyridazine, 2-aminoquinoxaline, guanidine, 2-aminothiazole, 2-aminothiadiazole, 2-aminopyridine, etc. Others will occur to those skilled in the art.

The reaction between the primary amine and the benzenesulfonyl halide will take place over a wide range of temperatures, from about 0° C. to 100° C. or higher.

As will appear from the equation, an acid is formed as the result of the reaction between the benzenesulfonyl halide and the primary amine. It is desirable, therefore, that the reaction take place in the presence of an alkali or a moderately strong alkaline substance, such as pyridine, tributyl amine, sodium hydroxide, sodium carbonate, or the like.

The second step in my process, the splitting off of the imide radical and formation of the amino group, is accomplished by heating with hydrazine hydrate at temperatures of 50° C. or higher. This reaction is usually conducted with the reactants dissolved, or suspended, in alcohol or alcohol-water mixture or in some other inert organic liquid. Upon heating the mixture, the desired aminobenzenesulfonamide is formed without hydrolysis or the formation of other undesirable side reaction products. The sulfonamide and the resulting hydrazide are easily separated by fractional crystallization as shown in the specific examples or by means of the selective solubility of the sulfonamide in dilute mineral acids.

My invention will now be described in greater detail by means of the following specific examples in which representative sulfonamides are prepared. It will be understood, of course, that other sulfonamides may be prepared in like manner from other primary amines and other sulfonyl halides. All parts are by weight unless otherwise indicated.

*Example 1*

21.0 parts of potassium N,N-phthaloylsulfanilate were suspended in 100 parts of dry benzene and refluxed with stirring with 12.8 parts of phosphorus pentachloride for one-half hour. The insoluble matter was filtered off from the hot solution. The filtrate on cooling and addition of 100 parts of petroleum ether deposited 3.7 parts of product. On recrystallization from 40 parts of ethylene dichloride the 2.7 parts of pure N,N-phthaloylsulfanilyl chloride resulting had a melting point of 240–243° C.

To 0.66 part of 2-aminopyridine dissolved in 10 parts of dry pyridine was added 2.2 parts of N,N-phthaloylsulfanilyl chloride, with stirring at room temperature. The acid chloride was added in the course of fifteen minutes, and after stirring at room temperature for an additional twenty minutes, the temperature was raised to 45° C. for one-half hour and finally to 75° for one-half hour. On cooling, the product crystallized from the reaction mixture. The entire reaction mixture was poured into 40 parts of cold water and after cooling for an hour at 2° C. was filtered. After washing the filter cake with water and methanol and drying at 98° C., 1.4 parts of crude product remained. Upon purification by dissolving in dilute hot sodium hydroxide solution, boneblacking, and precipitating with dilute acetic acid and after drying it melted at 279–281° C. (uncorrected).

1.60 parts of 2-$N^4$,$N^4$-phthaloylsulfanilamidopyridine was refluxed for three hours with 0.264 part of an 85% aqueous solution of hydrazine hydrate in 15 parts of 95% ethanol. The reaction mixture was cooled and filtered. Two types of crystals were present—thin needles, melting point 310–315° C. (decomp.) and stout prisms, melting point 185–190° C. This indicated a mechanical mixture of phthalic acid hydrazide and sulfapyridine. The mixture was separated by fractional crystallization from ethanol, the sulfapyridine having a much greater solubility in hot alcohol than the hydrazide. Finally 0.70 part of material, melting point 187–191° C., was obtained which gave no depression of melting point when mixed with a sample of sulfapyridine.

*Example 2*

22.3 parts of N-phenylphthalimide was added in the course of one-half hour to 37 parts of chlorosulfonic acid. The mixture was stirred and the temperature kept below 15° C. during the addition. The reaction mixture was then stirred for twenty minutes at room temperature and finally forty-five minutes at 65° C. The reaction mixture was cooled and poured in 400 parts of a mixture of ice and water. The resultant slurry was filtered and washed with water. The filter cake was dried in a desiccator, yielding 26 parts of crude product. On recrystallization from 200 parts of ethylene dichloride 8.9 parts of pure N,N-phthaloylsulfanilyl chloride was obtained.

A solution of 2.48 parts of sodium hydroxide in 4.6 parts of water was added dropwise to a stirred suspension of 3.35 parts of 95% guanidine nitrate in 30 parts of acetone. While cooling in an ice bath, 8.0 parts of N,N-phthaloylsulfanilyl chloride was added in the course of forty-five minutes. The resulting slurry was stirred for two hours at ice-bath temperature, and one additional hour at room temperature. The mixture was then poured into 200 parts of water and acidified to pH 2 with concentrated hydrochloric acid. The precipitate was filtered off and washed several times with cold water. After drying at 98° C., 8.6 parts of $N^4$,$N^4$-phthaloylsulfaguanidine was obtained. The crude product was recrystallized from 85 parts of glacial acetic acid, yielding 4.3 parts of product. On recrystallization from acetic acid the pure product melting about 290° C. (corr.) was obtained.

A suspension of 3.0 parts of once recrystallized $N^4$,$N^4$-phthaloylsulfaguanidine in 18 parts of 95% ethanol was treated with 0.52 part of an 85% aqueous hydrazine hydrate solution, and the mixture was refluxed for three hours. The alcohol was removed under vacuum and the crystalline residue was dissolved by boiling with 20 parts of water containing 2 parts of concentrated aqueous ammonia. On cooling, 1.25 parts of sulfaguanidine was obtained. On drying at 100° C. a product was obtained having a melting point of 188°–191° C. A mixed melting point with an authentic sample of sulfaguanidine gave no depression.

What I claim is:

1. A method of preparing aminobenzenesulfonamides which comprises the steps of reacting an imide-substituted-benzenesulfonyl halide having the formula

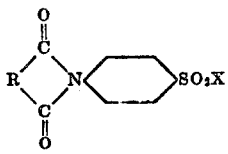

in which X is a halogen and R is a radical of the group consisting of alkylene, cycloalkylene and arylene radicals, with a primary amine and thereafter heating the reaction product with hydrazine hydrate to obtain an aminobenzenesulfonamide.

2. A method of preparing para-aminobenzenesulfonamides which comprises the steps of reacting N,N-phthaloylsulfanilyl chloride with a primary amine and thereafter heating the reaction product with hydrazine hydrate to obtain a para-aminobenzenesulfonamide.

3. A method of preparing para-aminobenzenesulfonamides which comprises the steps of reacting N,N-succinoylsulfanilyl chloride with a primary amine and thereafter heating the reaction product with hydrazine hydrate to obtain a para-aminobenzenesulfonamide.

4. A method of preparing sulfanilamido diazines which comprises the step of reacting N,N-phthaloylsulfanilyl chloride with an aminodiazine and thereafter heating the reaction product with hydrazine hydrate to obtain a sulfanilamido diazine.

5. A method of preparing sulfaguanidine which comprises the steps of reacting N,N-phthaloylsulfanilyl chloride with guanidine and thereafter heating the reaction product with hydrazine hydrate to obtain sulfaguanidine.

6. A method preparing para-aminobenzenesulfonamides which comprises the steps of reacting an N,N-phthaloylsulfanilyl halide with a primary amine in the presence of pyridine and thereafter heating the reaction product at a temperature of at least 50° C. with hydrazine hydrate in alcoholic solution to obtain a para-aminobenzenesulfonamide.

ROBERT WINTERBOTTOM.